US012734863B2

(12) United States Patent
Heintzelman et al.

(10) Patent No.: US 12,734,863 B2
(45) Date of Patent: Sep. 15, 2026

(54) SWITCHABLE VANITY MIRROR IN ELECTROCHROMIC SUN VISOR

(71) Applicant: GENTEX CORPORATION, Zeeland, MI (US)

(72) Inventors: Adam R. Heintzelman, Grand Rapids, MI (US); Bradley A. Bosma, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 388 days.

(21) Appl. No.: 18/492,866

(22) Filed: Oct. 24, 2023

(65) Prior Publication Data

US 2024/0131905 A1 Apr. 25, 2024
US 2024/0227515 A9 Jul. 11, 2024

Related U.S. Application Data

(60) Provisional application No. 63/380,770, filed on Oct. 25, 2022.

(51) Int. Cl.
*B60J 3/02* (2006.01)
*B60J 3/04* (2006.01)
(Continued)

(52) U.S. Cl.
CPC ............... *B60J 3/0213* (2013.01); *B60J 3/04* (2013.01); *B60J 3/06* (2013.01);
(Continued)

(58) Field of Classification Search
CPC . B60J 3/0213; B60J 3/0282; B60J 3/04; B60J 3/06; G02F 1/133528;
(Continued)

(56) References Cited

U.S. PATENT DOCUMENTS 4,068,930 A * 1/1978 Marcus .................. B60J 3/0282
296/97.5
5,142,406 A * 8/1992 Lampert ............... G02F 1/1525
359/275

(Continued)

FOREIGN PATENT DOCUMENTS

CN 114074535 A 2/2022
KR 200485022 Y1 12/2017
WO WO-2016150921 A1 * 9/2016 ............... C09K 9/02

*Primary Examiner* — Lori Lyjak
(74) *Attorney, Agent, or Firm* — Price Heneveld LLP; Brian James Brewer

(57) ABSTRACT

A visor assembly for an automobile includes an outer perimeter. The visor assembly further includes an electrochromic device configured to switch between a transparent state and a darkened state. The electrochromic device includes a first substrate defining a first element surface and a second element surface, a second substrate spaced away from the first substrate and defining a third element surface and a fourth element surface, and an electroactive medium positioned between the first and second substrates. The visor assembly further includes a liquid-crystal device configured to switch between a transparent state and a reflective state and a reflective polarizer positioned between the electrochromic device and the liquid-crystal device.

20 Claims, 6 Drawing Sheets

(51) Int. Cl.
*B60J 3/06* (2006.01)
*G02F 1/1335* (2006.01)
*G02F 1/137* (2006.01)
*G02F 1/157* (2006.01)

(52) U.S. Cl.
CPC ........ *G02F 1/133528* (2013.01); *G02F 1/137* (2013.01); *G02F 1/157* (2013.01); *B60J 3/0282* (2013.01); *G02F 2203/01* (2013.01)

(58) Field of Classification Search
CPC ......... G02F 1/133536; G02F 1/133567; G02F 1/137; G02F 1/1396; G02F 1/157; G02F 2201/44; G02F 2203/01
See application file for complete search history.

(56) References Cited

U.S. PATENT DOCUMENTS 5,239,406 A * 8/1993 Lynam ............. B32B 17/10339 359/275
5,548,492 A * 8/1996 Hansen .................... B60Q 3/66 362/140
2009/0168185 A1* 7/2009 Augustine .................. B60J 3/04 359/613
2012/0013981 A1* 1/2012 Matera ................ G02B 5/3058 359/485.05
2012/0205938 A1* 8/2012 Spahl ......................... B60J 3/04 296/97.1
2015/0109751 A1* 4/2015 Mochizuka ............ G02F 1/161 361/803
2016/0114731 A1* 4/2016 Habibi .................... G02F 1/157 345/173
2016/0193902 A1* 7/2016 Hill ........................ B60Q 3/252 296/97.4
2016/0193963 A1 7/2016 Anderson et al.
2017/0080782 A1* 3/2017 Spencer ..................... B60J 3/04
2018/0039148 A1* 2/2018 Franz ...................... G02F 1/161
2019/0162881 A1 5/2019 Cammenga et al.
2019/0275945 A1 9/2019 Chang et al.

* cited by examiner 42
44
10

46
48
10

50
10
52
54
10

10, 110
232
32, 132

10, 110
232
232
232
32, 132

10, 110
232
232
232
32, 132

SWITCHABLE VANITY MIRROR IN ELECTROCHROMIC SUN VISOR

CROSS-REFERENCE TO RELATED APPLICATION

This application claims priority to and the benefit under 35 U.S.C. § 119(e) of U.S. Provisional Application No. 63/380,770, filed on Oct. 25, 2022, entitled "SWITCHABLE VANITY MIRROR IN ELECTROCHROMIC SUN VISOR," the disclosure of which is hereby incorporated herein by reference in its entirety.

FIELD OF THE DISCLOSURE

The present disclosure generally relates to a visor assembly, and more particularly to a visor assembly with a switchable mirror element.

SUMMARY OF THE DISCLOSURE

According to one aspect of the present disclosure, a visor assembly for an automobile includes an outer perimeter. The visor assembly further includes an electrochromic device configured to switch between a transparent state and a darkened state. The electrochromic device includes a first substrate defining a first element surface and a second element surface. A second substrate is spaced away from the first substrate and defines a third element surface and a fourth element surface. An electroactive medium is positioned between the first and second substrates. The visor assembly further includes a liquid-crystal device configured to switch between a transparent state and a reflective state, and a reflective polarizer is positioned between the electrochromic device and the liquid-crystal device.

According to another aspect of the present disclosure, a visor assembly for an automobile includes an outer perimeter. The visor assembly further includes an electrochromic device configured to switch between a transparent state and a darkened state. The electrochromic device includes a first substrate defining a first element surface and a second element surface. A second substrate is spaced away from the first substrate and defines a third element surface and a fourth element surface. An electroactive medium is positioned between the first and second substrates. The visor assembly further includes a liquid-crystal device configured to switch between a twisted state and an untwisted state. A reflective polarizer is positioned between the electrochromic device and the liquid-crystal device and an absorbing polarizer is located on an opposite side of the liquid-crystal device than the reflective polarizer.

According to yet another aspect of the present disclosure, a visor assembly for an automobile includes an outer perimeter. The visor assembly further includes an electrochromic device configured to switch between a transparent state and a darkened state. The electrochromic device includes a first substrate defining a first element surface and a second element surface. A second substrate is spaced away from the first substrate and defines a third element surface and a fourth element surface. An electroactive medium is positioned between the first and second substrates. The visor assembly further includes a first electrode layer and a second electrode layer and a liquid-crystal device sandwiched between the first and second electrode layers and configured to switch between a twisted state and an untwisted state. A reflective polarizer is positioned between the electrochromic device and the liquid-crystal device.

These and other features, advantages, and objects of the present disclosure will be further understood and appreciated by those skilled in the art by reference to the following specification, claims, and appended drawings.

DETAILED DESCRIPTION

Figure 1:
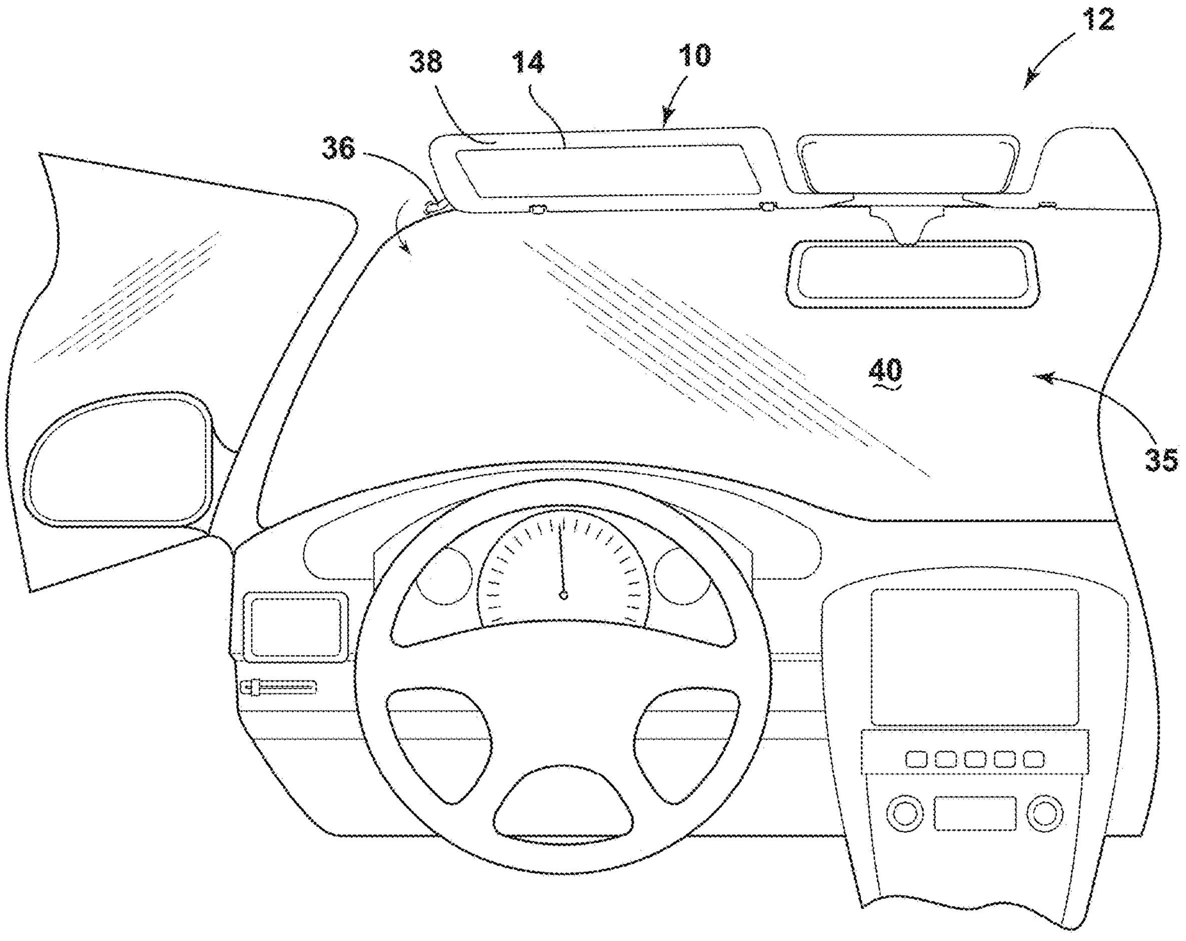
FIG. 1 is an interior perspective view of an automobile that incorporates a visor assembly in a conventional sun visor according to one aspect of the present disclosure.

The present illustrated embodiments reside primarily in combinations of method steps and apparatus components related to a visor assembly with a switchable mirror element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
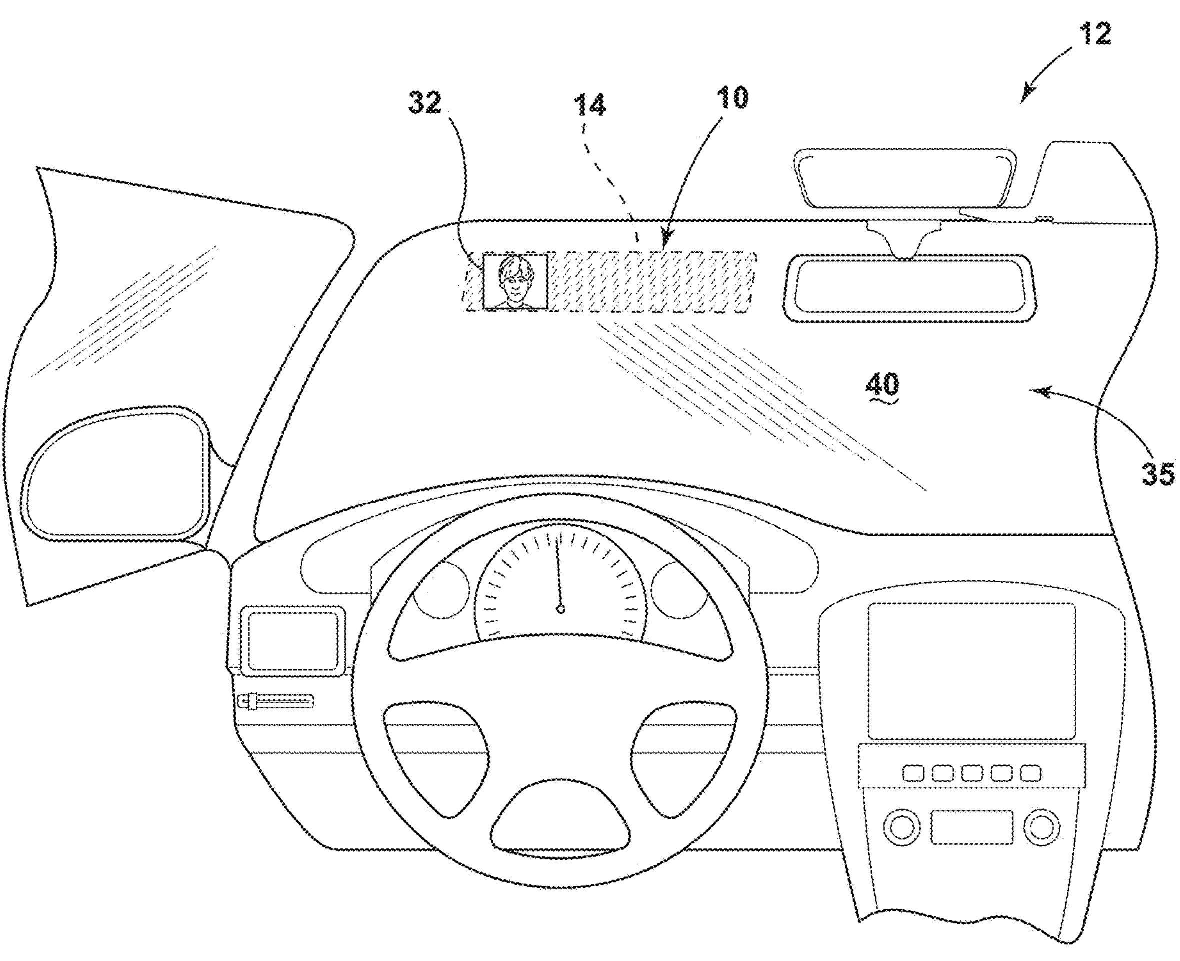
FIG. 2 is an interior perspective view of an automobile that incorporates a visor assembly in a front window according to one aspect of the present disclosure.
Figure 6:
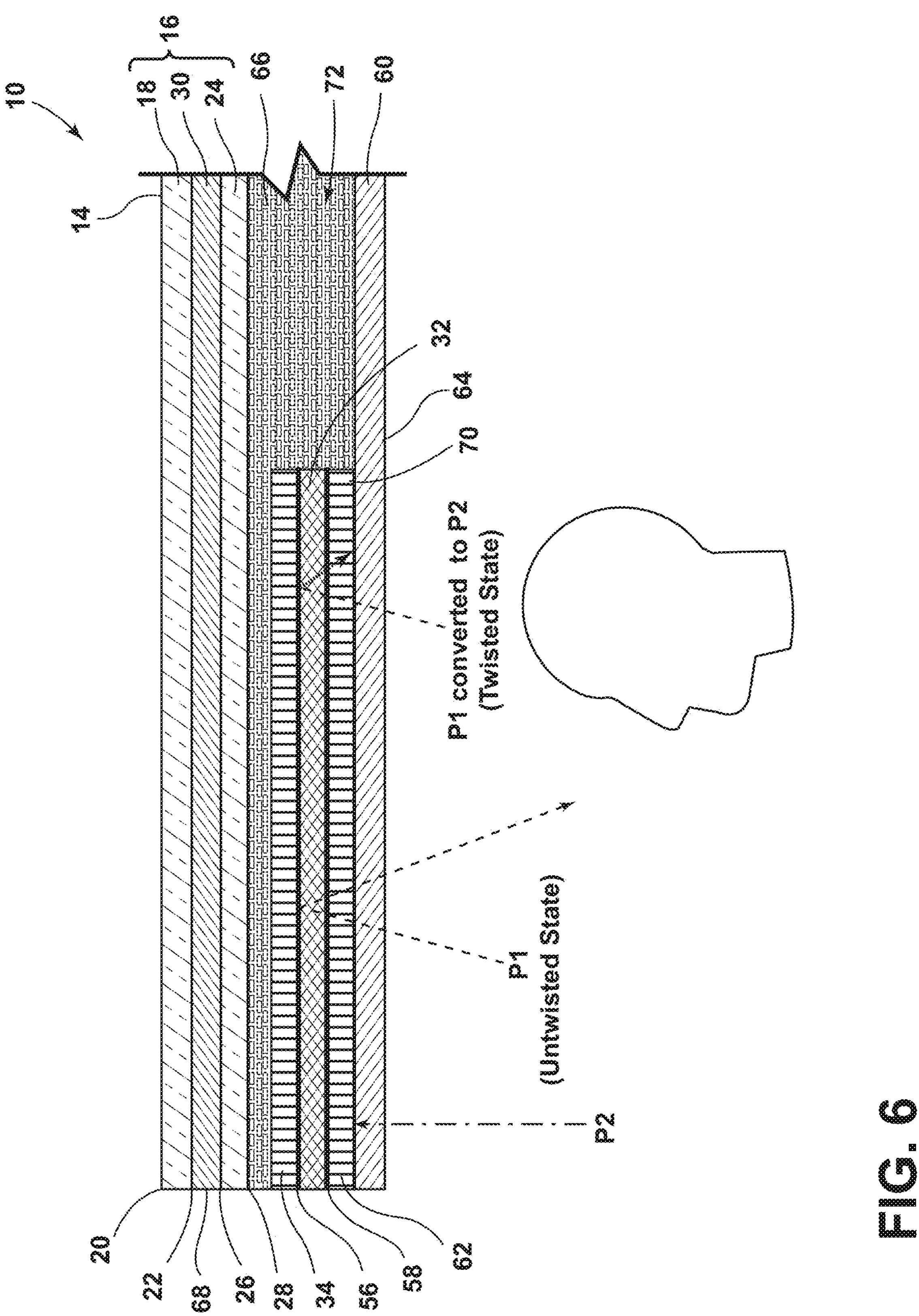
FIG. 6 is a cross-sectional view of a portion of a visor assembly in accordance with a first construction according to one aspect of the present disclosure.

Referring to FIGS. 1, 2, and 6, reference numeral 10 generally designates a visor assembly 10 for an automobile 12 in accordance with a first construction. The visor assembly 10 includes an outer perimeter 14 and an electrochromic device 16 that is configured to switch between a transparent state and a darkened state. The electrochromic device 16 includes a first substrate 18 defining a first element surface 20 and a second element surface 22. The electrochromic device 16 further includes a second substrate 24 spaced away from the first substrate 18 and defining a third element surface 26 and a fourth element surface 28. An electroactive medium 30 is positioned between the first and second substrates 18, 24. A liquid-crystal device 32 is coupled to the electrochromic device 16 and is configured to switch between a transparent state and a reflective state. A reflective element, such as a reflective polarizer 34 is positioned between the electrochromic device 16 and the liquid-crystal device 32. In some embodiments, the reflective element may include other constructions, such as a reflective film.

Referring now to FIGS. 1-5, various constructions of the visor assembly 10 may be incorporated with one or more structures. For example, FIG. 1 illustrates an interior cabin 35 of the automobile 12 that employs the visor assembly 10, for example, on a conventional sun visor location. More particularly, the visor assembly 10 may include a connection member 36 that couples the visor assembly 10 to the interior cabin 35. As indicated by the arrow, the connection member 36 may be configured to pivot and/or otherwise move the visor assembly 10 between a stowed position where the visor assembly 10 does not align with a driver's vision and an extended position where the visor assembly 10 is aligned with a driver's vision. In the extended position, the visor assembly 10 may, therefore, switch between transparent, darkened, or reflective states depending on the driver's needs. The visor assembly 10 may include a frame 38 (e.g., a bezel) that extends along at least part of the outer perimeter 14 (e.g., the entire outer perimeter) and couples with the connection member 36. With reference now to FIG. 2, the visor assembly 10 may, likewise, be incorporated into a window 40 (e.g., a front window) of the automobile 12. For example, outer perimeter 14 of the visor assembly 10 may be embedded within the window 40 such that a front surface and rear surface of the window 40 is substantially coextensive (e.g., not visibly stepped) at the visor assembly 10. In some embodiments, the automobile 12 may include a commercial vehicle, a bus, an emergency vehicle, a residential vehicle, or the like.

Figures 3, 4, 5:
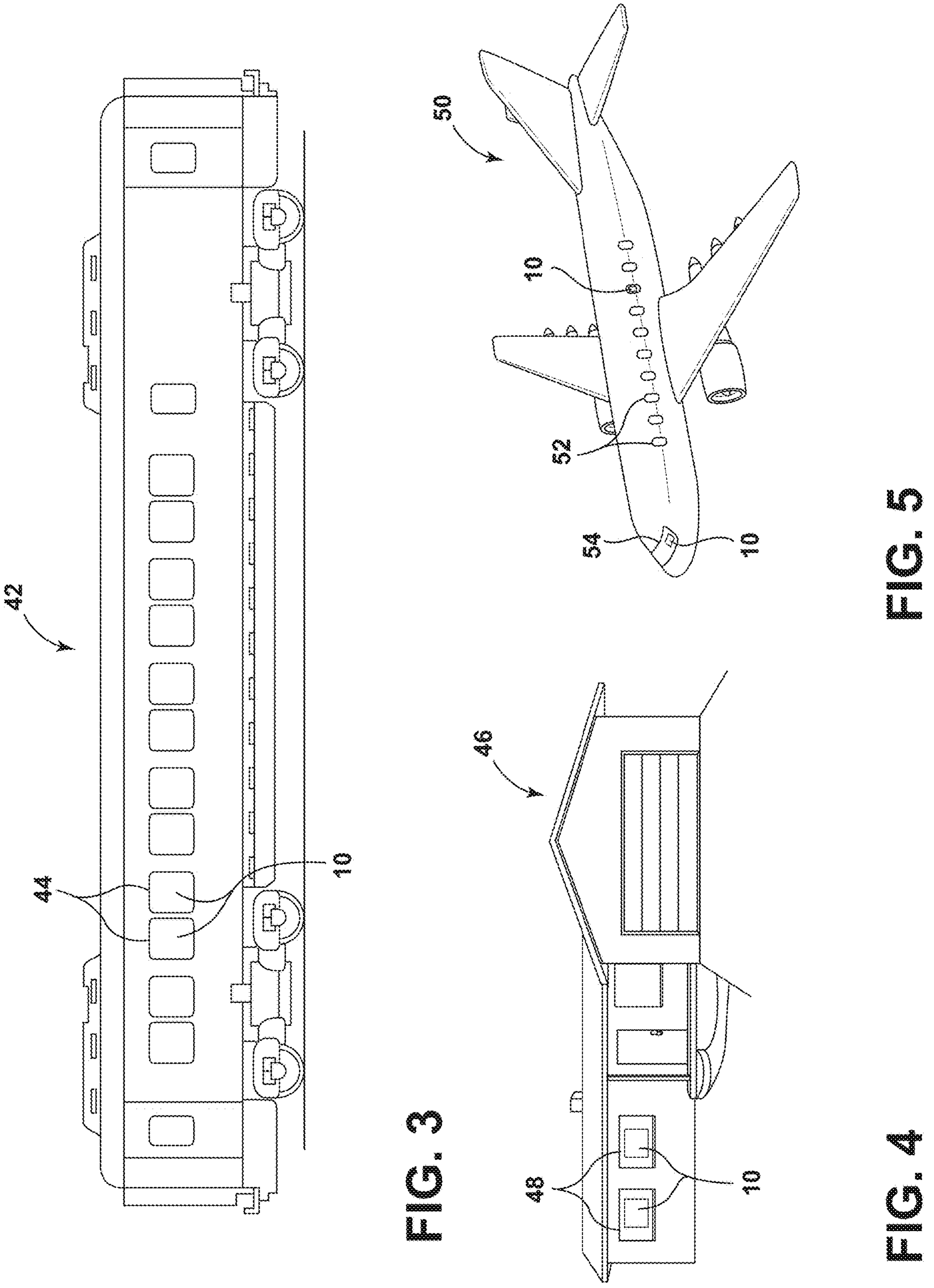
FIG. 3 is a side elevational view of a rail vehicle that incorporates a visor assembly according to one aspect of the present disclosure.
FIG. 4 is a front elevational view of a building, such as a home, that incorporates a visor assembly according to one aspect of the present disclosure.
FIG. 5 is a side perspective view of an airplane that incorporates a visor assembly according to one aspect of the present disclosure.

With reference now to FIG. 3, a railed vehicle 42 (e.g., a train, a subway, a trolley, and/or the like) may employ the visor assembly 10. For example, the visor assembly 10 may be located (e.g., embedded) in a train window 44 or located on the connection member 36 and/or otherwise on a slidable or pivotal curtain-type connection adjacent to the train window 44. With reference now to FIG. 4, a building 46 (e.g., a residential building, a commercial building, a medical facility, and/or the like) may employ the visor assembly 10. For example, the visor assembly 10 may be located (e.g., embedded) in a building window 48 or located on the connection member 36 and/or otherwise on a slidable or pivotal curtain-type connection adjacent to the building window 48. With reference to FIG. 5, an airplane 50 may employ the visor assembly 10. For example, the visor assembly 10 may be located (e.g., embedded) in airplane side windows 52 or airplane front windows 54 or located on the connection member 36 and/or otherwise on a slidable or pivotal curtain-type connection adjacent to the plane windows 52, 54.

With reference now to FIG. 6, the visor assembly 10 is illustrated in accordance with the first construction. The liquid-crystal device 32 may be sandwiched between a first electrode layer 56 and a second electrode layer 58, such that an application of an electrical field induces twisting and/or untwisting of liquid crystal molecules and results in the rotating of the polarization of the light (e.g., between a first polarization of light P1 and a second polarization light of light P2). In some embodiments, the liquid-crystal device 32 includes a twisted nematic configuration such that the liquid crystal molecules are in a twisted alignment until an electric field induces movement into an untwisted state. In the untwisted state, the first polarization of light P1 may be transmitted through the liquid-crystal device 32 without substantial alteration of the polarization. In this manner, the reflective polarizer 34 may be configured to reflect the first polarization of light P1 back to a viewer.

With continued reference to FIG. 6, the visor assembly 10 may further include a front substrate 60 located on an opposite side of the liquid-crystal device 32 than the reflective polarizer 34 and an absorbing polarizer 62 located between the front substrate 60 and the liquid-crystal device 32. The absorbing polarizer 62 may be configured to transmit the first polarization of light P1 and absorb the second polarization of light P2. In this manner, in the untwisted state, the first polarization of light P1 may be transmitted through the absorbing polarizer 62 and the liquid-crystal device 32 without substantial alteration of the polarization whereat it is reflected back to the viewer by the reflective polarizer 34. However, in the twisted state, the first polarization of light P1 is switched to the second polarization of light P2 and thus any incidental reflected rays of the second polarization of light P2 are absorbed by the absorbing polarizer 62.

The front substrate 60 may define a viewing surface 64 which is located closest to the observer. However, it should be appreciated that in some embodiments, the first element surface 20 of the electrochromic device 16 may define a viewing surface (i.e., be configured to be located closest to the observer). An optical adhesive 66 may be located between and connect the electrochromic device 16 to the liquid-crystal device 32. The electrochromic device 16 may define an EC outer perimeter 68, which may be equal to or less than the outer perimeter 14 of the visor assembly 10. The liquid-crystal device 32 may include an LC outer perimeter 70 that is equal to or less in size than the EC outer perimeter 68 of the electrochromic device 16. In the illustrated example, the LC outer perimeter 70 is completely within the EC outer perimeter 68 (e.g., which may include one or more sides of the EC outer perimeter 68 and the LC outer perimeter 70 in alignment). In this manner, a space 72 may be defined between portions of the electrochromic device 16 and the front substrate 60 outside of the LC perimeter 70. The optical adhesive 66 may substantially fill the space 72. In some embodiments, a refractive index of the optical adhesive 66, the front substrate 60, and the electrochromic device 16 in the transparent state are substantially matched.

The electroactive medium 30 may be located between a pair of electrode layers and include at least one solvent, at least one anodic material, and at least one cathodic material. Typically, both of the anodic and cathodic materials are electroactive, and at least one of them may be electrochromic. It will be understood that regardless of its ordinary definition, the term "electroactive" may include a material that undergoes a modification in its oxidation state upon exposure to a particular electrical potential difference. Additionally, it will be understood that the term "electrochromic" may include, regardless of its ordinary definition, a material that exhibits a change in its extinction coefficient at one or more wavelengths upon exposure to a particular electrical potential difference. The electroactive medium 30 can be actuated to vary a degree of transmission of light. Therefore, it should be appreciated that in the darkened state, the electrochromic device 16 may still permit a certain amount of transmission of light. For example, in the darkened state, the transmission of light may be about 40% or greater, about 50% or greater, about 60% or greater, about 70% or greater, about 80% or greater, or about 90% or greater.

Figure 7:
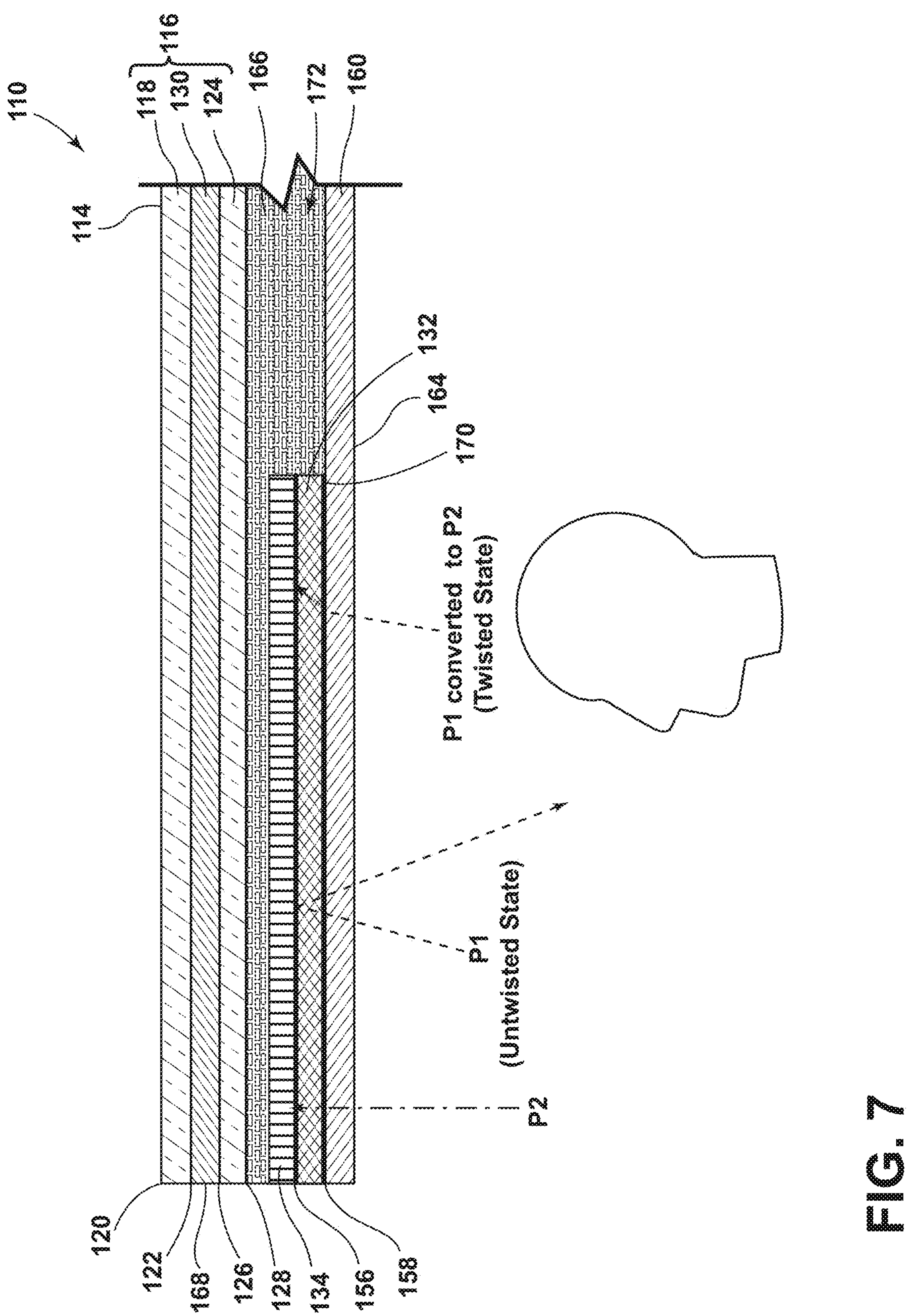
FIG. 7 is a cross-sectional view of a portion of a visor assembly in accordance with a second construction according to one aspect of the present disclosure.

With reference now to FIG. 7, a visor assembly 110 is illustrated in accordance with a second construction. Unless otherwise specified, the visor assembly 110 may be incorporated into at least the structures in FIGS. 1-5 and include similar features, elements, and materials as the other construction set forth herein and illustrated in FIG. 6. More particularly, the visor assembly 110 includes an outer perimeter 114 and an electrochromic device 116 that is configured to switch between a transparent state and a darkened state. The electrochromic device 116 includes a first substrate 118 defining a first element surface 120 and a second element surface 122. The electrochromic device 116 further includes a second substrate 124 spaced away from the first substrate 118 and defining a third element surface 126 and a fourth element surface 128. An electroactive medium 130 is positioned between the first and second substrates 118, 124. A liquid-crystal device 132 is coupled to the electrochromic device 116 and is configured to switch between a transparent state and a reflective state. A reflective polarizer 134 is positioned between the electrochromic device 116 and the liquid-crystal device 132.

With continued reference to FIG. 7, the liquid-crystal device 132 may be sandwiched between a first electrode layer 156 and a second electrode layer 158, such that an application of an electrical field induces twisting and/or untwisting of liquid crystal molecules and results in the rotating of the polarization of the light (e.g., between the first polarization light P1 and the second polarization light of light P2). In some embodiments, the liquid-crystal device 132 includes a guest host configuration such that at least one of polymers, inorganic particles, or dichroic dyes are interspersed with the liquid crystal molecules. The guest host configuration may eliminate the need for one or more polarizers described in reference to the first construction illustrated in FIG. 6. In the untwisted state, the first polarization of light P1 may be transmitted through the liquid-crystal device 132 without substantial alteration of the polarization. In this manner, the reflective polarizer 134 may be configured to reflect the first polarization of light P1 back to a viewer.

The visor assembly 110 may further include a front substrate 160 located on an opposite side of the liquid-crystal device 132 than the reflective polarizer 134. In some embodiments, the visor assembly 110 in accordance with the second construction does not include an absorbing polarizer. In this manner, in the untwisted state, the first polarization of light P1 may be transmitted through the liquid-crystal device 132 without substantial alteration of the polarization whereat it is reflected back to the viewer by the reflective polarizer 134.

The front substrate 160 may define a viewing surface 164 which is located closest to the observer. However, it should be appreciated that in some embodiments, the first element surface 120 of the electrochromic device 116 may define a viewing surface (e.g., the surface closest to the observer). An optical adhesive 166 may be located between and connect the electrochromic device 116 to the liquid-crystal device 132. The electrochromic device 116 may define an EC outer perimeter 168, which may be equal to or less than the outer perimeter 114 of the visor assembly 110. The liquid-crystal device 132 may include an LC outer perimeter 170 that is equal to or less in size than the EC outer perimeter 168 of the electrochromic device 116. In the illustrated example, the LC outer perimeter 170 is completely within the EC outer perimeter 168 (e.g., which may include one or more sides of the EC outer perimeter 168 and the LC outer perimeter 170 in alignment). In this manner, a space 172 may be defined between portions of the electrochromic device 116 and the front substrate 160 outside of the LC perimeter 170. The optical adhesive 166 may substantially fill the space 172. In some embodiments, a refractive index of the optical adhesive 166, the front substrate 160, and the electrochromic device 116 in the transparent state are substantially matched.

The electroactive medium 130 may be located between a pair of electrode layers and include at least one solvent, at least one anodic material, and at least one cathodic material. Typically, both of the anodic and cathodic materials are electroactive, and at least one of them may be electrochromic. It will be understood that regardless of its ordinary definition, the term "electroactive" may include a material that undergoes a modification in its oxidation state upon exposure to a particular electrical potential difference. Additionally, it will be understood that the term "electrochromic" may include, regardless of its ordinary definition, a material that exhibits a change in its extinction coefficient at one or more wavelengths upon exposure to a particular electrical potential difference. The electroactive medium 130 can be actuated to vary a degree of transmission of light. Therefore, it should be appreciated that in the darkened state, the electrochromic device 116 may still permit a certain amount of transmission of light. For example, in the darkened state, the transmission of light may be about 40% or greater, about 50% or greater, about 60% or greater, about 70% or greater, about 80% or greater, or about 90% or greater.

Figures 8, 9, 10:
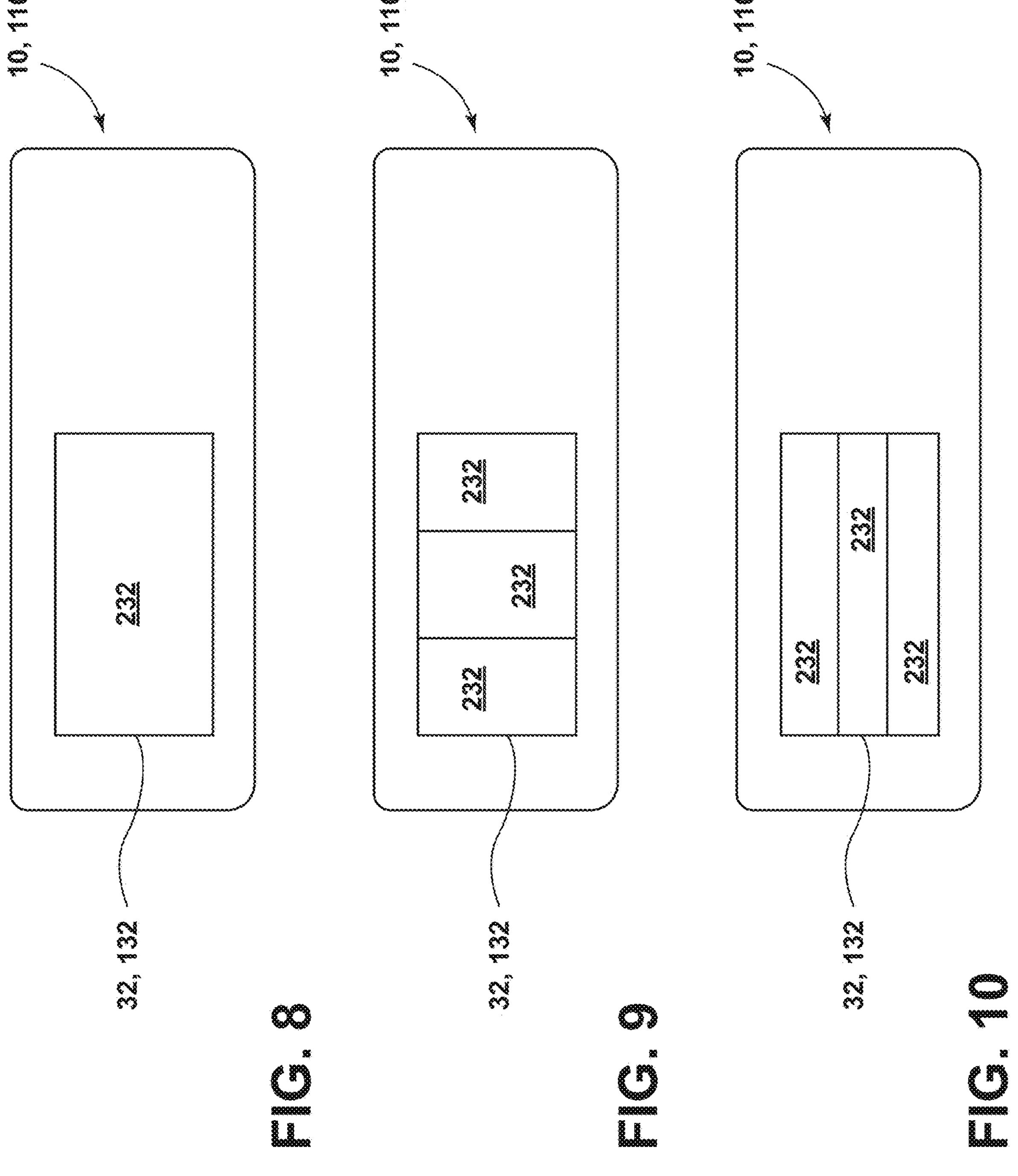
FIG. 8 is a front view of a visor assembly with a liquid-crystal device in accordance with a first segmentation according to one aspect of the present disclosure.
FIG. 9 is a front view of a visor assembly with a liquid-crystal device in accordance with a second segmentation according to one aspect of the present disclosure.
FIG. 10 is a front view of a visor assembly with a liquid-crystal device in accordance with a third segmentation according to one aspect of the present disclosure.

With reference now to FIGS. 8-10, the liquid-crystal device 32, 132 may include at least one segment 232. For example, FIG. 8 illustrates the visor assembly 10, 110 and the liquid-crystal device 32, 132 includes a single segment 232. FIG. 9 illustrates the visor assembly 10, 110 and the liquid-crystal device 32, 132 includes a plurality of segments 232 arranged sequentially in a horizontal direction. FIG. 10 illustrates the visor assembly 10, 110 and the liquid-crystal device 32, 132 includes a plurality of segments 232 arranged sequentially in a vertical direction. In should also be appreciated that the segments 232 may form a matrix of segments 232, each segment 232 of equal size. Each segment 232 may be individually controlled such that two segments 232 can contemporaneously be in different states. For example, a first segment 232 may be in a reflective state and a second segment 232 may contemporaneously be in a transparent state. The one or more segments 232 may be any number of shapes, such as circular, elliptical, and/or other shapes. As such, the dimension of the visor assembly 10, 110 that functions as a selectable mirror may be changed based on user preference or need.

The disclosure described herein is further summarized in the following paragraphs and is further characterized by combinations of any and all of the various aspects described therein.

According to one aspect of the disclosure, a visor assembly for an automobile includes an outer perimeter. The visor assembly further includes an electrochromic device configured to switch between a transparent state and a darkened state. The electrochromic device includes a first substrate that defines a first element surface and a second element surface. A second substrate is spaced away from the first substrate and defines a third element surface and a fourth element surface. An electroactive medium is positioned between the first and second substrates. The visor assembly further includes a liquid-crystal device configured to switch between a transparent state and a reflective state and a reflective polarizer is positioned between the electrochromic device and the liquid-crystal device.

According to another aspect, a connection member is coupled to an electrochromic device and is configured to pivot between a stowed position and an extended position.

According to yet another aspect, a frame is connected to an outer perimeter of a visor assembly and a connection member is connected to the frame.

According to still yet another aspect, an outer perimeter of a visor assembly is embedded in a window of an automobile.

According to another aspect, the window is a front window of an automobile.

According to yet another aspect, an electrochromic device includes an EC outer perimeter and a liquid-crystal device includes an LC outer perimeter completely within the EC outer perimeter.

According to still yet another aspect, a liquid-crystal device includes a twisted nematic configuration.

According to another aspect, a liquid-crystal device includes a guest host configuration.

According to yet another aspect, a liquid-crystal device includes at least two segments that can be individually switched between a transparent state and a reflective state.

According to still yet another aspect, a liquid-crystal device is located on a viewing surface side of an electrochromic device.

According to another aspect of the present disclosure, a visor assembly for an automobile includes an outer perimeter. The visor assembly further includes an electrochromic device configured to switch between a transparent state and a darkened state. The electrochromic device includes a first substrate defining a first element surface and a second element surface. A second substrate is spaced away from the first substrate and defines a third element surface and a fourth element surface. An electroactive medium is positioned between the first and second substrates. The visor assembly further includes a liquid-crystal device configured to switch between a twisted state and an untwisted state. A reflective polarizer is positioned between the electrochromic device and the liquid-crystal device and an absorbing polarizer is located on an opposite side of the liquid-crystal device than the reflective polarizer.

According to another aspect, the absorbing polarizer is configured to transmit a first polarization of light and absorb the second polarization of light.

According to yet another aspect, the reflective polarizer is configured to reflect the first polarization of light.

According to still yet another aspect, the liquid-crystal device is configured to absorb the first polarization of light in the in the twisted state and transmit the first polarization of light in the untwisted state.

According to another aspect, the liquid-crystal device includes a twisted nematic configuration.

According to yet another aspect, an optical adhesive is located between the electrochromic device and the liquid-crystal device.

According to still yet another aspect, the optical adhesive includes a refractive index that is matched with the electrochromic device in the transparent state.

According to yet another aspect of the present disclosure, a visor assembly for an automobile includes an outer perimeter. The visor assembly further includes an electrochromic device configured to switch between a transparent state and a darkened state. The electrochromic device includes a first substrate defining a first element surface and a second element surface. A second substrate is spaced away from the first substrate and defines a third element surface and a fourth element surface. An electroactive medium is positioned between the first and second substrates. The visor assembly further includes a first electrode layer and a second electrode layer and a liquid-crystal device sandwiched between the first and second electrode layers and configured to switch between a twisted state and an untwisted state. A reflective polarizer is positioned between the electrochromic device and the liquid-crystal device.

According to another aspect, the liquid-crystal device is configured to transmit a first polarization of light in the untwisted state and the reflective polarizer is configured to reflect the first polarization of light.

According to yet another aspect, the liquid-crystal device includes a guest host configuration.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A visor assembly for an automobile comprising:
- an outer perimeter;
- an electrochromic device configured to switch between a transparent state and a darkened state, the electrochromic device comprising:
  - a first substrate defining a first element surface and a second element surface;
  - a second substrate spaced away from the first substrate and defining a third element surface and a fourth element surface; and
  - an electroactive medium positioned between the first and second substrates;
- a liquid-crystal device configured to switch between a transparent state and a reflective state;
- a reflective polarizer positioned between the electrochromic device and the liquid-crystal device; and
- a front substrate coupled to the liquid-crystal device opposite the reflective polarizer that defines a viewing surface.

2. The visor assembly of claim 1, including a connection member coupled to the electrochromic device and configured to pivot between a stowed position and an extended position.

3. The visor assembly of claim 2, including a frame connected to the outer perimeter and wherein the connection member is connected to the frame.

4. The visor assembly of claim 1, wherein the outer perimeter is embedded in a window of the automobile.

5. The visor assembly of claim 4, wherein the window is a front window of the automobile.

6. The visor assembly of claim 1, wherein the electrochromic device includes an EC outer perimeter and the liquid-crystal device includes an LC outer perimeter that is smaller than the EC outer perimeter.

7. The visor assembly of claim 6, wherein an optical adhesive is located between the electrochromic device and the liquid-crystal device and between the front substrate and the second substrate near one or more regions of the EC outer perimeter that does not overlap the LC outer perimeter.

8. The visor assembly of claim 1, wherein the liquid-crystal device includes a guest host configuration.

9. The visor assembly of claim 1, wherein the liquid-crystal device includes at least two segments that can be individually switched between the transparent state and the reflective state.

10. The visor assembly of claim 1, wherein the liquid-crystal device is located towards the viewing surface relative to the electrochromic device.

11. A visor assembly for an automobile comprising:
- an outer perimeter;
- an electrochromic device configured to switch between a transparent state and a darkened state, the electrochromic device comprising:
  - a first substrate defining a first element surface and a second element surface;
  - a second substrate spaced away from the first substrate and defining a third element surface and a fourth element surface; and
  - an electroactive medium positioned between the first and second substrates;
- a liquid-crystal device coupled to the second substrate with an index matched optical adhesive and configured to switch between a twisted state and an untwisted state;
- a reflective polarizer positioned between the electrochromic device and the liquid-crystal device; and
- an absorbing polarizer located on an opposite side of the liquid-crystal device than the reflective polarizer.

12. The visor assembly of claim 11, wherein the absorbing polarizer is configured to transmit a first polarization of light and absorb a second polarization of light.

13. The visor assembly of claim 12, wherein the reflective polarizer is configured to reflect the first polarization of light.

14. The visor assembly of claim 13, wherein the liquid-crystal device is configured to absorb the first polarization of light in the in the twisted state and transmit the first polarization of light in the untwisted state.

15. The visor assembly of claim 11, wherein the liquid-crystal device includes a twisted nematic configuration.

16. The visor assembly of claim 11, wherein the electrochromic device includes an EC outer perimeter and the liquid-crystal device includes an LC outer perimeter that is smaller than the EC outer perimeter, and the optical adhesive is located between the electrochromic device and the liquid-crystal device and extends past the LC outer perimeter along the second substrate.

17. The visor assembly of claim 11, wherein the optical adhesive includes a refractive index that is matched with the electrochromic device in the transparent state.

18. A visor assembly for an automobile comprising:
- an outer perimeter;
- an electrochromic device configured to switch between a transparent state and a darkened state, the electrochromic device comprising:
  - a first substrate defining a first element surface and a second element surface;
  - a second substrate spaced away from the first substrate and defining a third element surface and a fourth element surface; and an electroactive medium positioned between the first and second substrates;

a first electrode layer and a second electrode layer;

a segmented liquid-crystal device including two or more individually addressable segments sandwiched between the first and second electrode layers and configured to switch between a twisted state and an untwisted state, wherein the electrochromic device includes an EC outer perimeter and the segmented liquid-crystal device includes an LC outer perimeter that is smaller than the EC outer perimeter; and a reflective polarizer positioned between the electrochromic device and the liquid-crystal device.

19. The visor assembly of claim 18, wherein the two or more individually addressable segments are configured to transmit a first polarization of light in the untwisted state and the reflective polarizer is configured to reflect the first polarization of light.

20. The visor assembly of claim 19, wherein the segmented liquid-crystal device includes a guest host configuration.

* * * * *